(12) United States Patent
Yoshida et al.

(10) Patent No.: US 11,029,899 B2
(45) Date of Patent: Jun. 8, 2021

(54) MAINTENANCE SYSTEM INCLUDING INFORMATION PROCESSING DEVICE THAT PERFORMS MAINTENANCE OPERATION ON IMAGE FORMING DEVICE

(71) Applicant: BROTHER KOGYO KABUSHIKI KAISHA, Aichi (JP)

(72) Inventors: Naoki Yoshida, Nagoya (JP); Eriko Takahashi, Nagoya (JP); Shintaro Kunimoto, Kiyosu (JP); Takashi Nishizaki, Nagoya (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 20 days.

(21) Appl. No.: 16/391,514

(22) Filed: Apr. 23, 2019

(65) Prior Publication Data

US 2019/0332332 A1 Oct. 31, 2019

(30) Foreign Application Priority Data

Apr. 25, 2018 (JP) .............................. JP2018-084283

(51) Int. Cl.
 *G06F 3/12* (2006.01)
 *H04N 1/00* (2006.01)
(52) U.S. Cl.
 CPC ............ *G06F 3/123* (2013.01); *G06F 3/1204* (2013.01); *G06F 3/1231* (2013.01);
 (Continued)
(58) Field of Classification Search
 CPC ........ G06F 3/123; G06F 3/204; G06F 3/1231; G06F 3/1234; G06F 3/1287; H04N 1/00222
 (Continued)

(56) References Cited

U.S. PATENT DOCUMENTS

| 2003/0063305 | A1 | 4/2003 | Mcintyre | |
|---|---|---|---|---|
| 2014/0320883 | A1* | 10/2014 | Ichida | G06F 3/1222 358/1.14 |
| 2014/0333952 | A1* | 11/2014 | Abe | G06F 3/1222 358/1.14 |

FOREIGN PATENT DOCUMENTS

| EP | 2 437 164 A1 | 4/2012 |
|---|---|---|
| JP | 2009-064290 A | 3/2009 |

OTHER PUBLICATIONS

Extended European Search Report dated Sep. 11, 2019 in European Patent Application No. 19 17 0909.6.

\* cited by examiner

*Primary Examiner* — Gabriel I Garcia
(74) *Attorney, Agent, or Firm* — Scully, Scott, Murphy & Presser, PC

(57) ABSTRACT

In a maintenance system, a controller of an information processing device is configured to perform receiving; storing; determining; and transmitting. The receiving receives a set of input information including device information, time information, and setting information via an input interface. The device information specifies a target image forming device. The time information specifies access time to access the target image forming device. The setting information relates to control data to be set in the target image forming device. The storing stores correlation information correlating the device information with the time information and setting information in a memory. The determining determines whether the access time has come. The transmitting transmits, in response to determining that the access time has come, the control data to the target image forming device via a network interface. The target image forming device is specified by the device information correlated by the correlation information.

15 Claims, 10 Drawing Sheets

(52) U.S. Cl.
CPC .......... *G06F 3/1234* (2013.01); *G06F 3/1287* (2013.01); *H04N 1/00222* (2013.01)

(58) Field of Classification Search
USPC .................................................. 358/1.1–1.18
See application file for complete search history.

FIG. 2

| IDENTIFIER | MODEL NAME | SETTING INFORMATION | EXECUTION TIMING |
|---|---|---|---|
| MFP-A | MODEL XYZ | FIRMWARE VERSION V  PRINT SETTING   SETTING P1  SCAN SETTING    SETTING S1 | ○○ O'CLOCK ON WEEKDAYS  △△ O'CLOCK ON WEEKDAYS  □□ O'CLOCK ON HOLIDAYS |
| MFP-B  MFP-C  MFP-D | MODEL XYZ | SETTING FILE XYZ | EVERY 30 MINUTES |
| GROUP XY | MODEL XY | SETTING FILE XY | EVERY HOUR ON THE HOUR |

FIG. 3

| GROUP NAME (422a) | DEVICE NAME (422b) | MODEL NAME (422c) |
|---|---|---|
| GROUP XX | MFP-E MFP-F | |
| GROUP XY | | MODEL XY |

| MODEL NAME (423a) | SETTING INFORMATION (423b) | EXECUTION TIMING (423c) |
|---|---|---|
| MODEL XY | SETTING FILE XY | EVERY HOUR ON THE HOUR |
| MODEL XYZ | SETTING FILE XYZ | EVERY 30 MINUTES |

423p, 423q, 423

MAINTENANCE SYSTEM INCLUDING INFORMATION PROCESSING DEVICE THAT PERFORMS MAINTENANCE OPERATION ON IMAGE FORMING DEVICE

CROSS REFERENCE TO RELATED APPLICATION

This application claims priority from Japanese Patent Application No. 2018-084283 filed Apr. 25, 2018. The entire content of the priority application is incorporated herein by reference.

TECHNICAL FIELD

The present disclosure relates to a maintenance system including an information processing device and an image forming device connectable therewith via a network, a non-transitory computer readable storage medium storing a set of program instructions for an information processing device with which an image forming device is connectable via a network, and an information processing device, and in particular, relates to maintenance of individual image forming devices in a system including a plurality of image forming devices.

BACKGROUND

The maintenance of an image forming device, such as a printer, includes change of various settings and update of programs, for example. Conventionally, maintenance workers have performed such maintenance of image forming devices by moving to an installation place of each image forming device and operating an operation panel of the image forming device, for example.

A technique for maintenance of image forming devices has been known in the art. This technique is applied to a system including a plurality of printers mutually connected via a network. In such a system of printers, a specific printer accepts a maintenance operation and transmits a file to another printer in the system. Then, the maintenance operation for the other printer is performed by remote control from the specific printer.

SUMMARY

Even with the technique described above, the maintenance operation has to be performed on each of the printers. As a result, the maintenance operation imposes a large burden on the maintenance worker when a large number of image forming devices need to be maintained.

In view of the foregoing, it is an object of the disclosure to provide a technique that reduces the workload of a maintenance worker performing a maintenance operation on a system including a plurality of image forming devices mutually connected via a network.

In order to attain the above and other objects, the present disclosure provides a maintenance system including: an information processing device; and an image forming device. The image forming device is connectable with the information processing device via a network. The information processing device includes: an input interface; a network interface; a memory; and a controller. The controller is configured to perform: (a) receiving; (b) storing; (c) determining; and (d) transmitting. The (a) receiving receives a set of input information via the input interface. The set of input information includes: device information; time information; and setting information. The device information specifies a target image forming device. The time information specifies access time to access the target image forming device. The setting information relates to control data to be set in the target image forming device. The (b) storing stores first correlation information in the memory. The first correlation information correlates the device information with the time information and the setting information. The (c) determining determines whether the access time specified by the time information has come. The time information is correlated by the first correlation information stored in the memory. The (d) transmitting transmits, in response to determining that the access time has come, the control data to the target image forming device via the network interface. The target image forming device is specified by the device information correlated with the time information specifying the access time by the first correlation information.

According to another aspect, the present disclosure also provides a non-transitory computer readable storage medium storing a set of program instructions for an information processing device. An image forming device is connectable with the information processing device via a network. The information processing device includes: an input interface; a network interface; a memory; and a controller. The set of program instructions, when installed on and executed by the controller, causes the information processing device to perform: (a) receiving; (b) storing; (c) determining; and (d) transmitting. The (a) receiving receives a set of input information via the input interface. The set of input information includes: device information; time information; and setting information. The device information specifies a target image forming device. The time information specifies access time to access the target image forming device. The setting information relates to control data to be set in the target image forming device. The (b) storing stores correlation information in the memory. The correlation information correlates the device information with the time information and the setting information. The (c) determining determines whether the access time specified by the time information has come. The time information is correlated by the correlation information stored in the memory. The (d) transmitting transmits, in response to determining that the access time has come, the control data to the target image forming device via the network interface. The target image forming device is specified by the device information correlated with the time information specifying the access time by the correlation information.

According to still another aspect, the present disclosure also provides an information processing device including: an input interface; a network interface; a memory; and a controller. The controller is configured to perform: (a) receiving; (b) storing; (c) determining; and (d) transmitting. The (a) receiving receives a set of input information via the input interface. The set of input information includes: device information; time information; and setting information. The device information specifies a target image forming device. The time information specifies access time to access the target image forming device. The setting information relates to control data to be set in the target image forming device. The (b) storing stores correlation information in the memory. The correlation information correlates the device information with the time information and the setting information. The (c) determining determines whether the access time specified by the time information has come. The time information is correlated by the correlation information stored in the memory. The (d) transmitting transmits, in response to determining that the access time has come, the control data to the target image forming device via the network interface. The target image forming device is specified by the device information correlated with the time information specifying the access time by the correlation information.

BRIEF DESCRIPTION OF THE DRAWINGS

The particular features and advantages of the disclosure as well as other objects will become apparent from the following description taken in connection with the accompanying drawings, in which:

FIG. 2 illustrates a table of a schedule information database stored in a management data storage area of a personal computer (abbreviated herein as "PC") in the network system according to the embodiment;

FIG. 3 illustrates a table of a group information database stored in the management data storage area of the PC in the network system according to the embodiment;

FIG. 4 illustrates a table of a rule information database stored in the management data storage area of the PC in the network system according to the embodiment;

DETAILED DESCRIPTION

A system and a set of program instructions employed on the system according to one embodiment will now be described in detail with reference to the accompanying drawings. The embodiment describes a set of program instructions installed on and executed by an information processing device for comprehensive management of a plurality of image forming devices in a network system in which the image forming devices and information processing device are mutually connected to each other.

Figure 1:
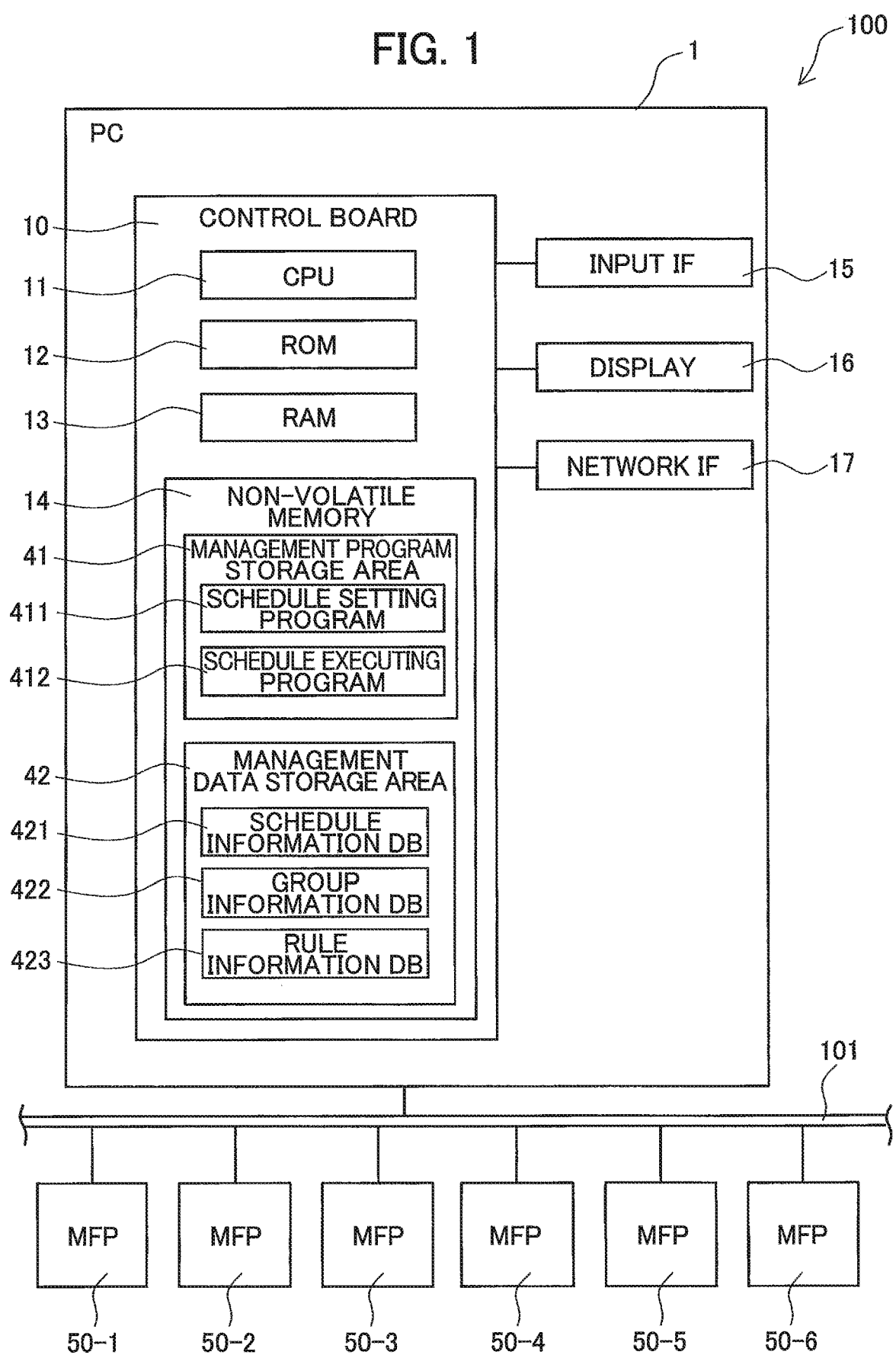
FIG. 1 is a block diagram illustrating an electrical configuration of a network system according to one embodiment of the present disclosure.

As illustrated in FIG. 1, a network system 100 according to the present embodiment includes a PC 1 and a plurality of multifunction peripherals (abbreviated herein as "MFPs") 50-1, 50-2, 50-3, 50-4, 50-5, and 50-6. Hereinafter, each of the MFPs 50-1 to 50-6 will be also referred to as the MFP 50. The PC 1 is an example of the information processing device of the present disclosure, and the MFPs 50-1 to 50-6 are an example of the image forming device of the present disclosure. The PC 1 and the MFPs 50-1 to 50-6 are mutually connected via a network 101. The network system 101 may include any number of PCs and MFPs besides those illustrated in FIG. 1.

As illustrated in FIG. 1, the PC 1 according to the present embodiment includes a control board 10 provided with a central processing unit (abbreviated herein as "CPU") 11, a read only memory (abbreviated herein as "ROM") 12, a random-access memory (abbreviated herein as "RAM") 13, and a non-volatile memory 14. The PC 1 further includes an input interface (abbreviated herein as "input IF") 15, a display 16, and a network interface (abbreviated herein as "network IF") 17. These components are electrically connected to the control board 10. The term "control board 10" is a generic term indicating hardware and software used for control of the PC 1. Thus, the control board 10 in FIG. 1 may not necessarily correspond to a single hardware unit installed on the PC 1.

The CPU 11 performs various processes under the control of programs read from the ROM 12 and the non-volatile memory 14 or in accordance with user operations. The CPU 11 is an example of the controller of the present disclosure. The ROM 12 stores a boot program for booting the PC 1. The RAM 13 is used as a work area for performing the various processes or a storage area for temporarily storing data. The non-volatile memory 14 is a hard disk drive (abbreviated herein as "HDD") or a flash memory, for example. The non-volatile memory 14 is used as an area for storing various programs, data such as image data and text data, and various settings. The ROM 12, RAM 13, and non-volatile memory 14 each is an example of the memory of the present disclosure. If the CPU 11 is provided with a CPU buffer, the CPU buffer is also an example of the memory of the present disclosure.

The memory of the present disclosure is not limited to the HDD and the like installed on the PC 1, but may be any type of storage medium readable and writable by the CPU 11. A computer-readable storage medium is a non-transitory medium. In addition to the examples mentioned above, non-transitory media include recording media, such as a compact disk-read only memory (abbreviated herein as "CD-ROM") and a digital versatile disk-read only memory (abbreviated herein as "DVD-ROM"). A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

The input IF 15 includes hardware, such as a keyboard and a mouse, that receives an input operation by a user. The display 16 includes hardware for displaying information on a screen. Alternatively, the PC 1 may include a touch panel serving as both the input IF 15 and the display 16. The input IF 15 is not limited to one that receives direct input from the user to the PC 1, and may receive input through communication with the network 101. For example, the PC 1 may transmit to another device data on a web page that accepts input. In this case, this device may accept input to the web page and transmit the inputted data to the PC 1.

The network IF 17 includes hardware for establishing communication with the MFPs 50-1 to 50-6 via the network 101. The network IF 17 may further include hardware for establishing communication with external devices via the Internet or the like. The network IF 17 may establish communication in accordance with any wired or wireless communication standard.

The non-volatile memory 14 of the PC 1 according to the present embodiment has a management program storage area 41 and a management data storage area 42. The management program storage area 41 stores management programs for managing the MFPs 50-1 to 50-6 connected to the PC 1 via the network 101. The management programs stored in the management program storage area 41 are an example of the set of program instructions of the present disclosure. The management data storage area 42 stores management data used by the management programs stored in the management storage area 41. The management data contains various types of information related to the management of the MFPs 51 to 56.

The management programs stored in the management program storage area 41 include a schedule setting program 411 and a schedule executing program 412. The schedule setting program 411 has a function to display information indicated by the management data, such as the setting of the MFPs 50-1 to 50-6, on the display 16. The schedule setting program 411 also has a function to receive an input operation via the input IF 15 and a function to edit information contained in the management data on the basis of the received input. Execution of the schedule setting program 411 enables the PC 1 to accept an instruction to edit the management data stored in the management data storage area 42 from the administrator of the network system 100, for example. The schedule setting program 411 is an example of the set of program instructions and the set of first program instructions of the present disclosure.

The schedule executing program 412 manages the MFPs 50-1 to 50-6 connected to the network 101 on the basis of the management data stored in the management data storage area 42. The schedule executing program 412 is, for example, a resident program in the PC 1 and runnable even while the schedule setting program 411 is not running Execution of the schedule executing program 412 enables the PC 1 to automatically and constantly manage, for example, the settings of the MFPs 50-1 to 50-6 in accordance with the management data 42. The schedule execution program 412 is an example of the set of program instructions and the set of second program instructions of the present disclosure.

The management data stored in the management data storage area 42 includes a schedule information database (abbreviated herein as "schedule information DB") 421, a group information database (abbreviated herein as "group information DB") 422, and a rule information database (abbreviated herein as "rule information DB") 423. The schedule information DB 421, the group information DB 422, and the rule information DB 423 are accessible by both the schedule setting program 411 and the schedule executing program 412.

The schedule information DB 421 records information for management of the MFPs 50-1 to 50-6 in the network system 100. As illustrated in FIG. 2, the schedule information DB 421 has a plurality of records including records 421p, 421q, and 421r, each of which is a collection of a plurality of fields. The plurality of fields respectively corresponds to a plurality of items including items "IDENTIFIER" 421a, "MODEL NAME" 421b, "SETTING INFORMATION" 421c, and "EXECUTION TIMING" 421d. Each of the plurality of records 421p, 421q, and 421r in the schedule information DB 421 may include fields corresponding to items other than those described above. Hereinafter, each of the plurality of records 421p, 421q, and 421r will be also referred to schedule information 421p, 421q, and 421r, and each of the plurality of fields will be also referred to by the name of the corresponding item. In other words, in the schedule information DB 421, a plurality of sets of information is stored under the items "IDENTIFIER" 421a, "MODEL NAME" 421b, "SETTING INFORMATION" 421c, and "EXECUTION TIMING" 421d. The plurality of sets of information will be also referred to by the name of the corresponding item, namely, the identifier 421a, model name 421b, setting information 421c, and execution timing 421d. In the schedule information DB 421, a plurality of sets of information including the identifier 421a, model name 421b, setting information 421c, and execution timing 421d is correlated into a single set of schedule information or a single record.

In each record, the identifier 421a specifies information identifying one or more MFPs 50 for which the record is set. Each MFP 50 is assigned a unique name for identifying it individually, for example a node name determined by the administrator, as the identifier 421a. Alternatively, the identifier 421a may be an IP address, or a MAC address or serial number assigned when the MFP 50 is manufactured. The identifier 421a may specify information individually identifying each of the one or more MFPs 50 or information identifying a group of MFPs. For example, the identifier 421a may be a group name. The group name is associated with the corresponding MFPs 50 in the group information DB 422.

In the example illustrated in FIG. 2, the schedule information 421p is a record set for a single device "MFP-A." The schedule information 421q is a record set for three devices "MFP-B," "MFP-C," and "MFP-D." The schedule information 421r is a record set for a single group "group XY." Alternatively, in schedule information, the identifier 421a may specify information identifying a plurality of groups individually.

The model name 421b specifies information indicating the model of the MFPs 50-1 to 50-6 connected to the PC 1. In the example illustrated in FIG. 2, each set of schedule information 41p, 421q, and 421r is a record including one model name as the model name 421b. Alternatively, schedule information may be a record including a plurality of model names as the model name 421b. Further, the schedule information DB421 may not include the model name 421b.

The setting information 421c specifies various setting information. The setting information 421c include some or all of the information on the firmware, print setting, scan setting, network setting, and security setting of the MFP 50. Each setting includes a plurality of items. Each item specifies a parameter. The CPU (not illustrated) of an MFP 50 executes the firmware stored in the memory of the MFP 50 in accordance with the various parameters also stored in the memory (not illustrated) of the MFP 50, thereby activating the MFP 50. The information on the firmware includes version information of the firmware, for example. Thus, the setting information 421c relates to various settings including a plurality of items. The setting information is an example of the control data of the present disclosure. The various settings specified by the setting information 421c may not include parameters for all items configurable in the MFP 50. For example, in a case where the print setting includes items such as color, print resolution, and sheet size, only the color item may specify a parameter. The items of various settings are an example of the type of the set of setting data of the present disclosure.

Alternatively, in the schedule information DB 421, the setting information 421c may specify information specifying a setting file. A setting file collectively stores various setting information. The setting file is stored separately from the schedule information DB 421 in the non-volatile memory 14 and is accessible by the schedule setting program 411 and the schedule executing program 412. In the example illustrated in FIG. 2, the schedule information 421p is a record including various setting information as the setting information 421c with no change. In contrast, each of the schedule information 421q and schedule information 421r is a record including the name of the setting file as the setting information 421c.

The execution timing 421d specifies information on the execution timing of the management process performed in accordance with the schedule executing program 412. The execution timing 421d may specify a periodic interval, a specific execution time such as date and time, or a periodic timing such as a day of the week or a date. The management process performed in accordance with the schedule executing program 412 includes processes to compare the information specified by the execution timing 421d with the date and time information indicating the current date and time, and to determine whether the execution timing has arrived, as described later. Alternatively, information on the current date and time may be acquired from the operating system (OS) of the PC 1.

Although FIG. 2 illustrates the schedule information DB 421 having a plurality of records 421p, 421q, and 421r, the schedule information DB 421 may have only one record. For example, the network system 100 may include single MFP 50 and the record may correspond to the single MFP 50 in the network system 100. Alternatively, the record or schedule information may correspond to a plurality of MFPs 50 all configured in accordance with the shared setting information 421c and execution timing 421d.

The group information DB 422 included in the management data stored in the management data storage area 42 has a plurality of records including records 422p and 422q, each of which is a collection of a plurality of fields. The plurality of fields respectively corresponds to a plurality of items including items "GROUP NAME" 422a, "DEVICE NAME" 422b, and "MODEL NAME" 422c, for example. Each of the plurality of records 422p and 422q will be also referred to group information 422p and 422q, and each of the plurality of fields will be also referred to by the name of the corresponding item. In other words, in the group information DB 422, a plurality of sets of information is stored under the items "GROUP NAME" 422a, "DEVICE NAME" 422b, and "MODEL NAME" 422c. The plurality of sets of information will be also referred to by the name of the corresponding item, namely, the group name 422a, device name 422b, and model name 422c. In the group information DB 422, the group name 422a is correlated with the device name 422b or the model name 422c, as illustrated in FIG. 3. In other words, a plurality of sets of information including the group name 422a and one of the device name 422b and model name 422c is correlated into a single set of group information or a single record.

In the example of FIG. 3, the group information 422p is a record set for a group "GROUP XX." The group information 422p indicates that the group "GROUP XX" includes two devices "MFP-E" and "MFP-F." The group information 422q is a record set for a group "GROUP XY." The group information 422q indicates that the group "GROUP XY" includes all MFPs 50 of which the model name is "model XY." For example, when the PC 1 performs a process with reference to the schedule information DB 421 having a record in which a group name is stored under the item "IDENTIFIER" 421a, the PC 1 can further refer to the group information DB 422 to identify the MFPs 50 in the group corresponding to the group name. The group may not be specified by the model name 422c. Thus, the group information DB 422 may not include the item "MODEL NAME" 422c.

The rule information DB 423 included in the management data stored in the management data storage area 42 has a plurality of records including records 423p and 423q, each of which is a collection of a plurality of fields. The plurality of fields respectively corresponds to a plurality of items including items "MODEL NAME" 423a, "SETTING INFORMATION" 423b, and "EXECUTION TIMING" 423c, for example. Each of the plurality of records 423p and 423q will be also referred to rule information 423p and 423q, and each of fields will be also referred to by the name of the corresponding item. In other words, in the rule information DB 423, a plurality of sets of information is stored under the items "MODEL NAME" 423a, "SETTING INFORMATION" 423b, and "EXECUTION TIMING" 423c. The plurality of sets of information will be also referred to by the name of the corresponding item, namely, the model name 423a, setting information 423b, and execution timing 423c. In the rule information DB 423, a plurality of sets of information including the model name 423a, setting information 423b, and execution timing 423c is correlated into a single set of rule information or a single record, as illustrated in FIG. 4.

The setting information 423b specifies information similar to the information specified by the setting information 421c in the schedule information DB 421. The execution timing 423c specifies information similar to the information specified by the execution timing 421d in the schedule information DB 421. In the example of FIG. 4, the rule information 423p indicates that a setting file "SETTING FILE XY" is established in all MFPs 50 of which the model name is "MODEL XY" at every hour on the hour. The rule information 423q indicates that a setting file "SETTING FILE XYZ" is established in all MFPs of which the model name is "MODEL XYZ" every thirty minutes.

The PC 1 according to the present embodiment executes the schedule setting program 411 to receive an instruction for adding information to the management data stored in the management data storage area 42 or editing the information in the management data stored in the management data storage area 42. The PC 1 then stores in the management data storage area 42 of the non-volatile memory 14 the management data updated in accordance with the received instruction. For example, the PC 1 receives an instruction specifying any of the schedule information DB 421, group information DB 422, and rule information DB 423 as an editing target. The PC 1 then displays a list of information included in the specified editing target and receives instructions for adding information to, editing the information in, or updating the information in the specified editing target.

Further, the PC 1 according to the present embodiment executes the schedule executing program 412 to identify a record that has reached the timing stored under the item "EXECUTION TIMING" 421d in the schedule information DB 421 and to set the information stored under the item "SETTING INFORMATION" 421c for the MFP 50 or MFPs 50 specified by the information stored under the item "IDENTIFIER" 421a in the identified record.

Next, the processes for management in accordance with the management program 41 will be described.

In general, flowcharts in this specification depict steps performed by the CPU 11 according to instructions described in programs such as the management program 41. In other words, actions such as "determine," "select," "determine," "acquire," "receive," "control," and the like in the following description represent steps performed by the CPU 11. The processes performed by the CPU 11 include processes that control hardware through the application programming interface (abbreviated herein as "API") of the OS of the PC 1. In this specification, the operation of each program will be described without mentioning the OS. That is, the phrase "program B controls hardware C" in the following description may be synonymous to the phrase "the program B controls hardware C through the API of the OS." The processes performed by the CPU 11 under the instructions of a program may be described with such language. For example, the phrase "the CPU 11 executes" may be expressed as "the management program 41 executes."

In this specification, the term "acquire" is used under a concept that need not necessarily require a request. That is, a process in which the CPU 11 receives data without issuing a request is included in the concept of "the CPU 11 acquires data." Further, "data" in this specification represents bit strings that a computer can read. Further, data of different formats are treated as the same data when the content of the data is essentially the same. The same holds true for "information" in this specification. The term "request" is used under a concept that outputs information indicating a request, and the term "instruct" is used under a concept that outputs information indicating an instruction. The information indicating a request and the information indicating an instruction may be also expressed as "request" and "instruction," respectively.

Further, a process in which the CPU 11 determines whether information A indicates circumstance B may be described conceptually as "determining whether circumstance B on the basis of information A." A process in which the CPU determines whether information A indicates circumstance B or circumstance C may be described conceptually as "determining whether circumstance B or circumstance C on the basis of information A."

A display process performed by the PC 1 according to instructions described in the schedule setting program 411 and a management process performed by the PC 1 according to instructions described in the schedule executing program 412 will be described with reference to flowcharts. The schedule setting program 411 and the schedule executing program 412 are independently executed by the PC 1. In other words, the PC 1 can execute one of the schedule setting program 411 and the schedule executing program 412 or simultaneously execute both of the schedule setting program 411 and the schedule executing program 412.

The display process will be described with reference to the flowchart illustrated in FIG. 5. The display process is performed by the CPU 11 of the PC 1, for example, upon receipt of a display instruction of status information. Alternatively, the PC 1 may perform the display process when the PC 1 receives an error notification outputted in a management process described later.

In S101 of the display process, the CPU 11 first acquires status information stored in the non-volatile memory 14. The status information is information on the status of each MFP 50 in the network system 100. The status information is stored in the non-volatile memory 14, for example, by executing the schedule executing program 412. In S102 the CPU 11 controls the display 16 on the basis of the acquired status information to display a status screen 62, such as that illustrated in FIG. 6.

Figure 6:
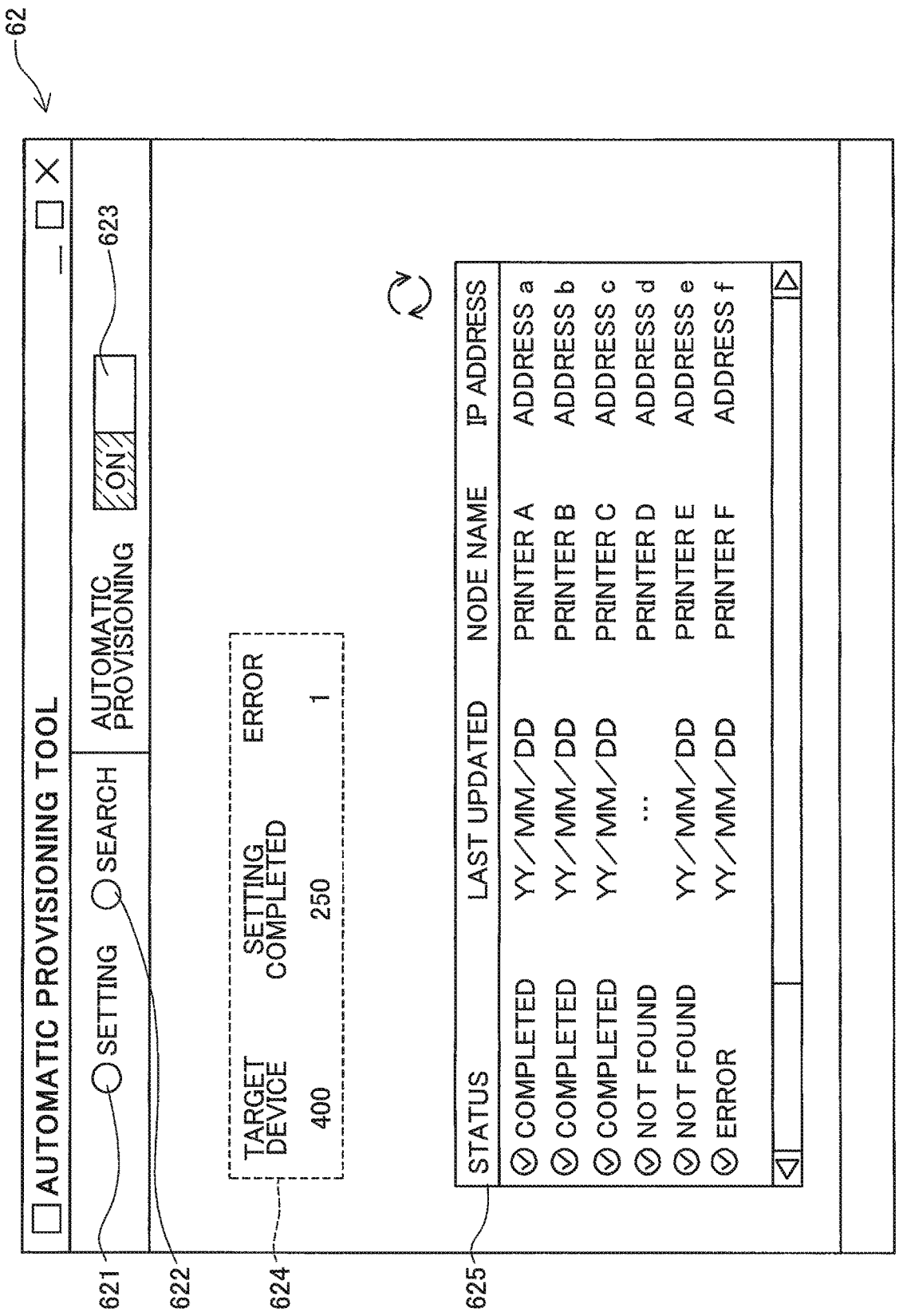
FIG. 6 illustrates an example of a status screen displayed on a display of the PC.

The status screen 62 illustrated in FIG. 6 includes, for example, a setting button 621, a search button 622, a function ON/OFF button 623, a progress status display area 624, and a device status display area 625. The setting button 621 is operated to instruct editing of the schedule information DB 421. The search button 622 is operated to instruct a search for a newly connected MFP 50. The function ON/OFF button 623 is operated to turn ON/OFF an automatic setting function for an MFP 50. The progress status display area 624 indicates the progress status of the automatic setting. In the example illustrated in FIG. 6, the progress status display area 624 indicates the number of target MFPs 50 for automatic setting, the number of MFPs 50 that have completed the automatic setting, and the number of MFPs 50 having an error. The device status display area 625 indicates the progress status of the automatic setting for each target MFP 50.

In S103 the CPU 11 determines whether an instruction to input settings (setting input instruction) has been received. For example, when the setting button 621 is operated on the status screen 62 in FIG. 6, the CPU 11 determines that the setting input is instructed. When the setting input is instructed (S103: YES), in S104 the CPU 11 performs a setting input process for editing the schedule information DB 421.

Figure 7:
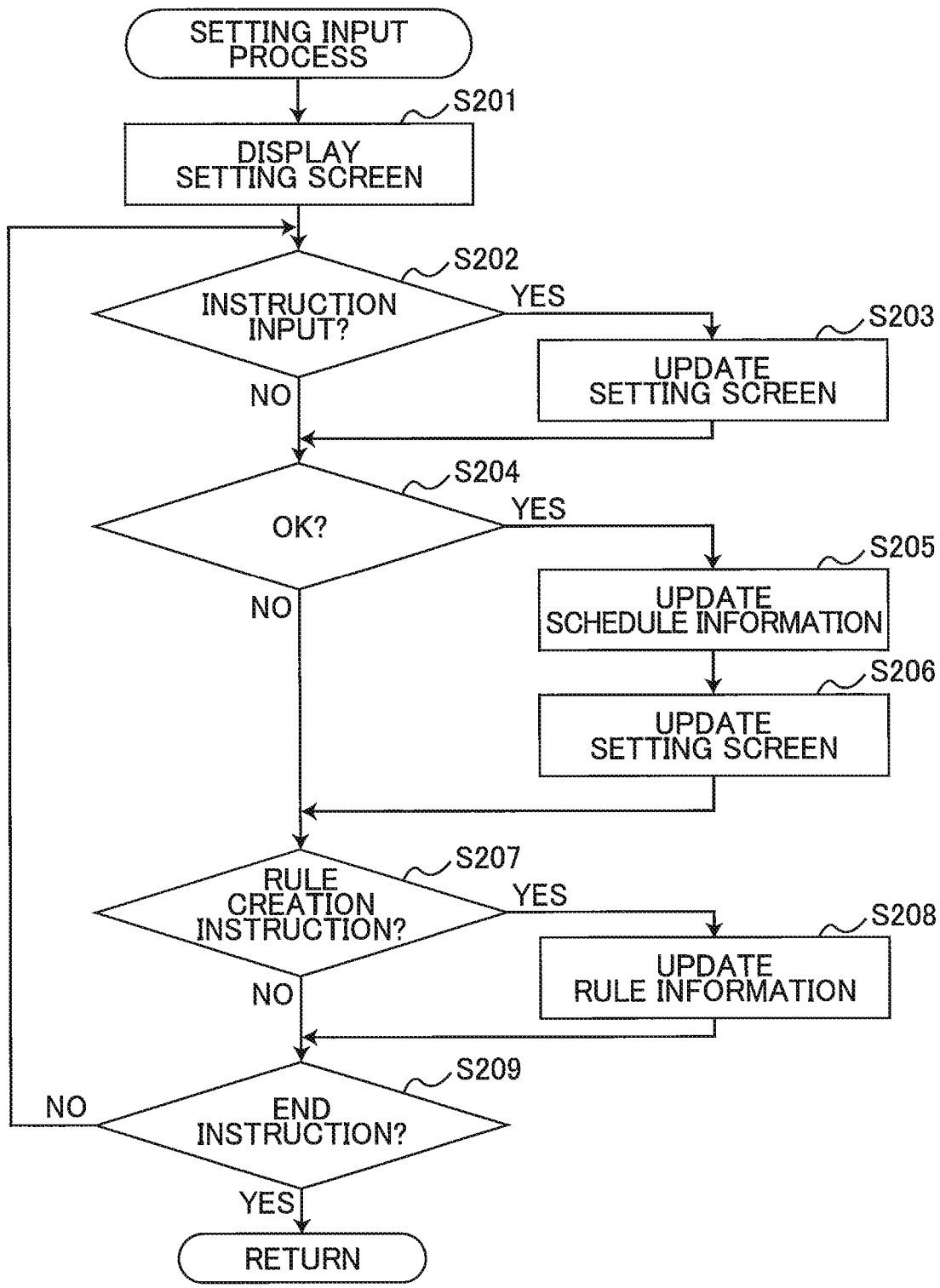
FIG. 7 is a flowchart illustrating steps in a setting input process executed by the CPU of the PC.

The setting input process will now be described with reference to the flowchart illustrated in FIG. 7. In S201 of the setting input process, the CPU 11 first controls the display 16 to display a setting screen 61, such as that illustrated in FIG. 8. The setting screen 61 is an example of the input screen of the present disclosure, and the process of S201 is an example of the (g) displaying of the present disclosure. The setting screen 61 illustrated in FIG. 8 includes a file designation box 611, timing designation boxes 612, a device designation box 613, a rule creation button 614, and an OK button 615. The file designation box 611 is operated to specify a setting file. The timing designation boxes 612 are operated to specify an execution interval as the execution timing. The device designation box 613 is operated to specify a target MFP 50.

Figure 8:
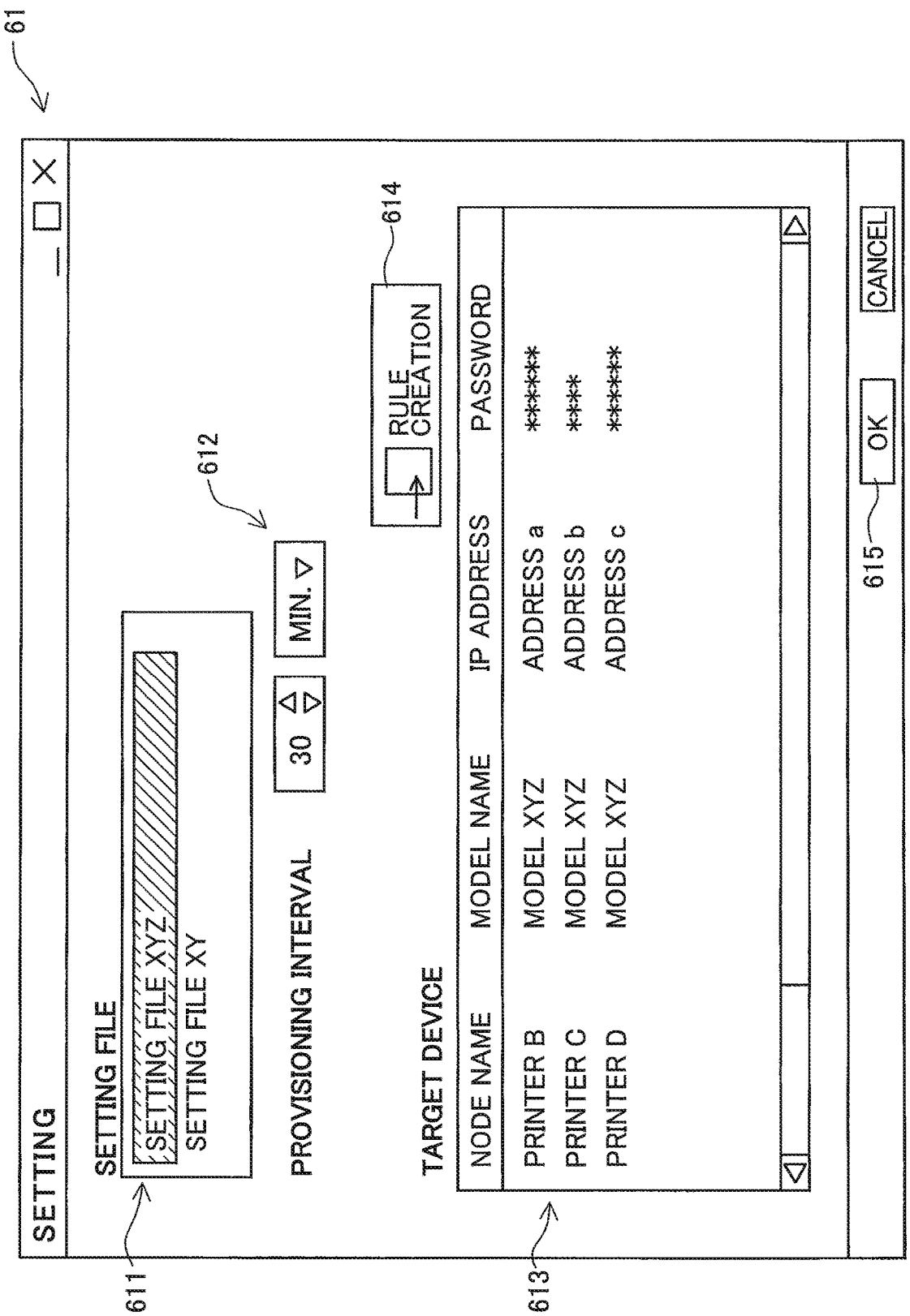
FIG. 8 illustrates an example of a setting screen displayed on the display of the PC.

The setting screen 61 illustrated in FIG. 8 is merely an example of a display used for updating the schedule information DB 421. Alternatively, the setting screen 61 may have any other configuration. The setting screen 61 may include, for example, an input box operated to input various settings, in place of the file designation box 611. Moreover, the setting screen 61 may include, for example, an input box operated to input specific date and time, in place of the timing designation boxes 612.

In S202 the CPU 11 determines whether at least one of the file designation box 611, the timing designation boxes 612, and the device designation box 613 in the setting screen 61 being displayed has been operated to input an instruction. The process of S202 is an example of the (a) receiving of the present disclosure. If an instruction has been inputted (S202: YES), in S203 the CPU 11 updates the displayed content of the setting screen 61.

FIG. 8 illustrates an example of a setting screen 61 for storing a record in the schedule information DB 421. The record specifies one setting file "SETTING FILE XYZ" as the setting information 421*c* and thirty-minutes intervals as the execution timing 421*d*, and correlates them with three MFPs 50. Such a setting screen 61 allows a user to make the same setting collectively for a plurality of target MFPs 50, thereby reducing the workload of input by the user.

Subsequent to the process of S203 or if an instruction is not inputted (S202: NO), in S204 the CPU 11 determines whether the OK button 615 is operated. If the OK button 615 is operated (S204: YES), in S205 the CPU 11 updates the schedule information DB 421 in accordance with the information specified in the setting screen 61. The process of S205 is an example of the (b) storing of the present disclosure.

Specifically, the CPU 11 stores the information specified in the setting screen 61 under the corresponding items in the record being edited in the schedule information DB 421. The setting screen 61 in FIG. 8 illustrates an example for storing "SETTING FILE XYZ" under the item "SETTING INFORMATION" 421c and information specifying thirty-minutes intervals under the item "EXECUTION TIMING" 421d in a record specifying three MFPs 50 having node names "PRINTER B," "PRINTER C," and "PRINTER D" as the identifier 421a. Since the setting information 421c and the execution timing 421d are set for being shared among the three MFPs 50, the three MFPs 50 may be grouped together. For example, the group name may be inputted to the setting screen 61, and the group name may be set as the identifier 421a.

In S206 the CPU 11 updates the setting screen 61 or the list of records registered in the schedule information DB 421 on the basis of the updated schedule information DB 421. The process of S206 is an example of the (h) updating of the present disclosure.

Subsequent to the process of S206 or if the OK button 615 is not operated (S204: NO), in S207 the CPU 11 determines whether the rule creation button 614 is operated. If the rule creation button 614 is operated (S207: YES), in S208 the CPU 11 updates the rule information DB 423 (see FIG. 4). The process of S208 is an example of the (o) storing of the present disclosure.

Specifically, the CPU 11 generates a record and stores the same in the rule information DB 423. The generated record correlates the model name of the MFP 50 specified in the device designation box 613 in the setting screen 61, the setting information specified in the file designation box 611, and the execution timing specified in the timing designation boxes 512 with each other. In the example illustrated in FIG. 8, a rule is established to apply the "setting file XYZ" to the MFPs 50 having a model name of "model XYZ" at thirty-minutes intervals. As a result, for example, the rule information 423q illustrated in FIG. 4 is stored in the rule information DB 423. Alternatively, the CPU 11 may control the display 16 to display a screen for creating a rule. The screen can be operated to specify a rule to be stored in the rule information DB 423.

Subsequent to the process of S208 or if the rule creation button 614 is not operated (S207: NO), in S209 the CPU 11 determines whether an end instruction is received. If an end instruction is not received (S209: NO), the CPU 11 returns to performing a process of S202 to receive an input. If an end instruction is received (S209: YES), the CPU 11 ends the setting input process and returns to performing the display process.

Figure 5:
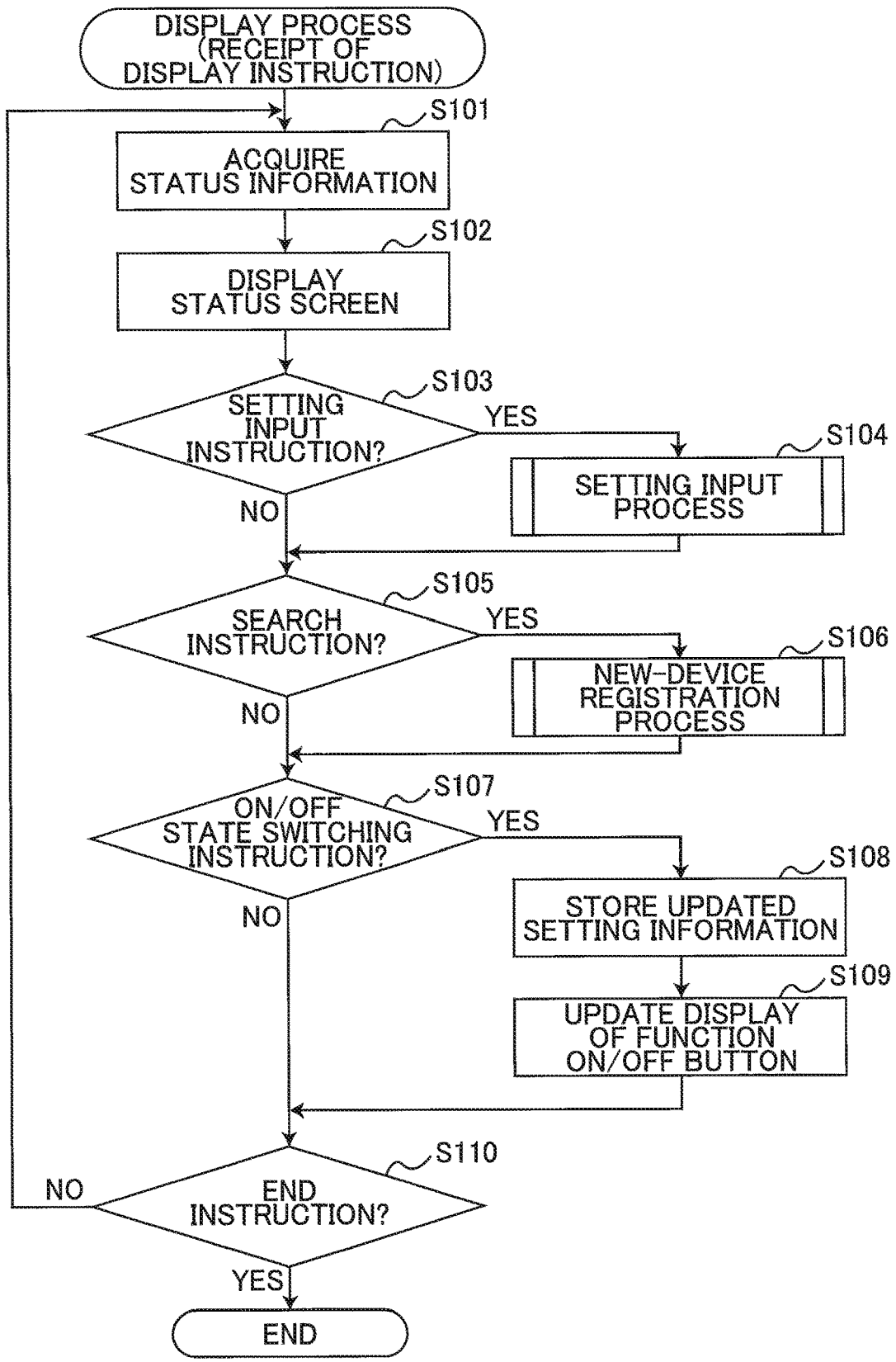
FIG. 5 is a flowchart illustrating steps in a display process executed by a CPU of the PC, and the display process is performed upon receipt of a display instruction.

Continuing with the description of the display process with reference to FIG. 5, subsequent to the process of S104 in the setting input process or if a setting input is not instructed (S103: NO), in S105 the CPU 11 determines whether a search is instructed. When the search button 622 in the status screen 62 in FIG. 6 is operated, for example, the CPU 11 determines that a search is instructed.

When a search is instructed (S105: YES), in S106 the CPU 11 performs a new-device registration process. In the new-device registration process, the CPU 11 searches for a connection with a new device not registered in the schedule information DB 421. If a connection with a new device is found, the CPU 11 registers the device in the schedule information DB 421.

Figure 9:
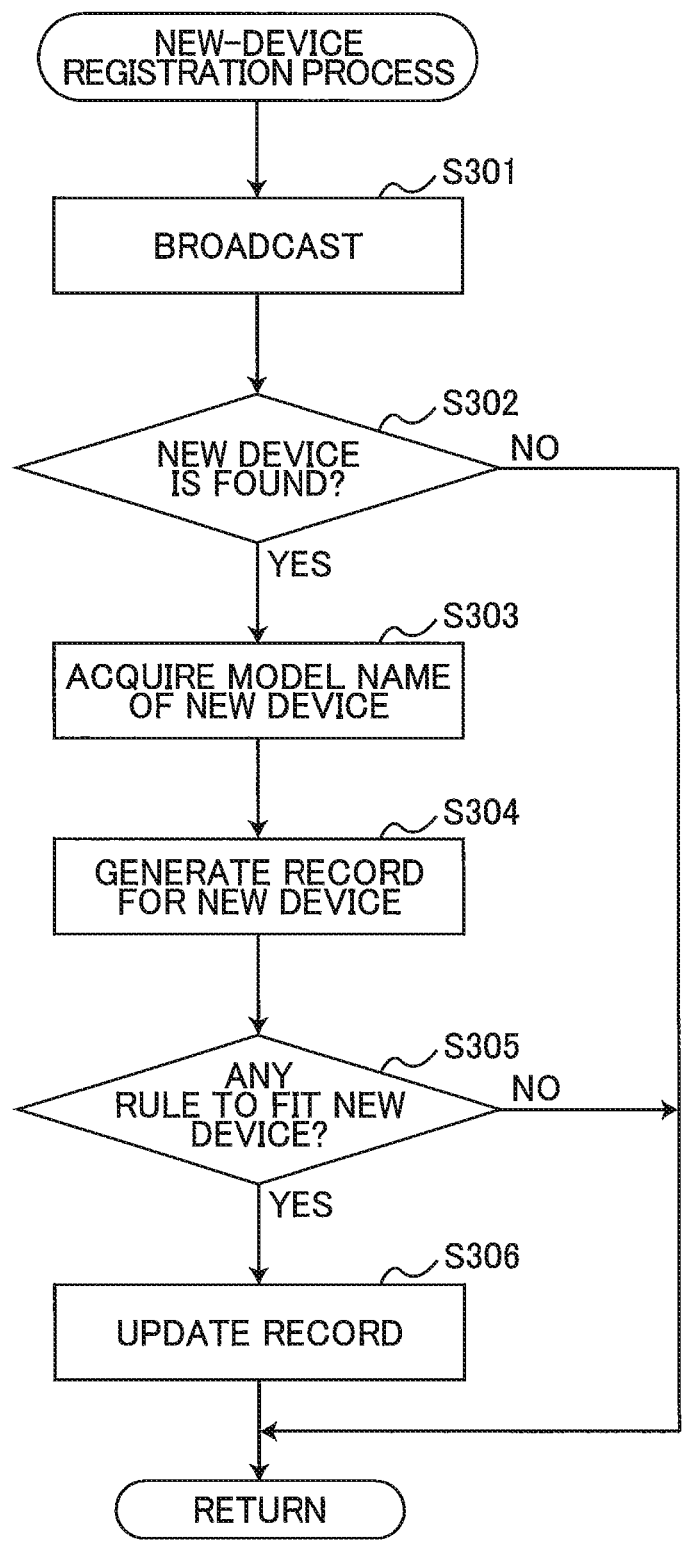
FIG. 9 is a flowchart illustrating steps in a new-device registration process executed by the CPU of the PC.

The new-device registration process will now be described with reference to the flowchart illustrated in FIG. 9. In S301 of the new-device registration process, the CPU 11 controls the network IF 17 to broadcast a search request to the devices connected in the network system 100. In S302 the CPU 11 determines whether a new device that is not registered in the schedule information DB 421 is connected to the network 101 on the basis of the response to the broadcast.

If a new device is found (S302: YES), in S303 the CPU 11 acquires the model name of the new device. In S304 the CPU 11 then generates in the schedule information DB 421 a record including information on the new device under the items "IDENTIFIER" 421a and "MODEL NAME" 421b. Before generating the record of the new device, the CPU 11 may inquire of the user whether to proceed with the generation of the record. For example, the CPU 11 may display a notification that a new device has been found and may receive an instruction as to whether to register the new device in the schedule information DB 421.

In S305 the CPU 11 determines whether there is a rule to fit the new device. Specifically, the CPU 11 compares the model name of the new device with the model name 423a of each record in the rule information DB 423, and determines whether any of the records includes a model name matching the model name of the new device. In other words, the CPU 11 determines whether any of the records include a rule to fit the new device. If there is a record to fit the new device (S305: YES), in S306 the CPU 11 updates the setting information 421c and execution timing 421d of the record generated in S304 so as to respectively match the setting information 423b and execution timing 423c of the record indicating the rule that fits the new device. The process of S306 is an example of the (r) storing of the present disclosure.

Subsequent to the process of S306, if a new device is not found (S302: NO), or if there is no rule to fit the new device (S305: NO), the CPU 11 ends the new-device registration process and returns to performing the display process. When there is no rule to fit the new device, the PC 1 may inquire of the user and receive an input to the schedule information DB 421.

Continuing with the description of the display process in FIG. 5, subsequent to the new-device registration process in S106 or if a search is not instructed (S105: NO), in S107 the CPU 11 determines whether an instruction to switch the ON/OFF state of the automatic setting function (ON/OFF state switching instruction) is received. For example, when the function ON/OFF button 623 in the status screen 62 in FIG. 6 is operated, the CPU 11 determines that the switching of the ON/OFF state of the automatic setting function is instructed. For example, when the function ON/OFF button 623 in the status screen 62 in FIG. 6 is operated, the CPU 11 determines that the switching of the ON/OFF state of the automatic setting function is instructed. Receiving the input operation on the function ON/OFF button 623 is an example of the receiving (i) of the present disclosure.

If the switching of the ON/OFF state of the automatic setting function is instructed (S107: YES), in S108 the CPU 11 stores the switched setting information, i.e., updated setting information in the non-volatile memory 14. In S109 the CPU 11 also updates content displayed by the function ON/OFF button 623 in the status screen 62 in FIG. 6.

Subsequent to the process of S109 or if the switching of the ON/OFF state of the automatic setting function is not instructed (S107: NO), in S110 the CPU 11 determines whether an end instruction is received. If an end instruction is not received (S110: NO), the CPU 11 returns to performing the process of S101 and continues the display process. If an end instruction is received (S110: YES), the CPU 11 closes the status screen 62 and ends the display process.

Next, the management process will be described with reference to the flowchart illustrated in FIG. 10. The management process is performed by the CPU 11 of the PC 1, for example, upon launching the schedule executing program 412. The schedule executing program 412 is automatically launched by the OS of the PC 1, for example, upon start-up of the PC 1.

In S401 of the management process, the CPU 11 determines whether the automatic setting function is turned ON. The setting information indicating the ON/OFF state of the automatic setting function is stored in the non-volatile memory 14 through processes such as the above-described display process. The CPU 11 reads out the setting information indicating the ON/OFF state of the automatic setting function from the non-volatile memory 14 and performs determination of S401.

The automatic setting function is a function for automatically managing an MFP 50 in accordance with the information in the schedule information DB 421. The setting information on the ON/OFF state of the automatic setting function is an example of the automatic transmission information specifying the automatic transmission function of the present disclosure. When the automatic setting function is turned ON, the setting of the automatic transmission function is valid. When the automatic setting function is turned OFF, the automatic transmission function is invalid. When the automatic transmission function is invalid, the PC 1 may not execute the schedule executing program 412.

If the automatic setting function is turned ON (S401: YES), in S402 the CPU 11 refers to the management data stored in the management data storage area 42 and determines whether any of the records stored in the schedule information DB 421 has reached the execution timing specified by the execution timing 421*d* thereof. The process of S402 is an example of the (c) determining of the present disclosure. In the example of the schedule information DB 421 illustrated in FIG. 2, for example, if the current date and time matches the date and time specified by the execution timing 421*d* in the schedule information 421*p*, the CPU 11 determines that the schedule information 421*p* has reached the execution timing.

If any one or more records have reached the execution timing (S402: YES), in S403 the CPU 11 performs a management execution process on the relevant record. The management execution process is a process to match the settings of the device having the identifier specified by the identifier 421*a* of the record that has reached the execution timing to the settings stored as the setting information 421*c* of the record in the schedule information DB 421. The record that has reached the execution timing is an example of the first correlation information including the time information specifying the access time determined to have come of the present disclosure. The device specified by the identifier 421*a* of the record is an example of the target image forming device of the present disclosure. The setting information stored in the record is an example of the control data of the present disclosure.

The management execution process will now be described with reference to the flowchart illustrated in FIG. 11. The CPU 11 performs the management execution process for each record that has been determined to be relevant in S402 of the management process. In other words, the CPU 11 performs the management process for each record that has reached the execution timing.

In S501 of the management execution process, the CPU 11 first reads out the information on the setting information 421*c* in the relevant record. When a setting file is specified, the information in the setting file is read out.

In S502 the CPU 11 accesses an MFP 50 specified by the identifier 421*a* in the record and receives from the MFP 50 the current setting information corresponding to the setting information specified by the setting information 421*c* read out from the relevant record. The process of S502 is an example of the (e) acquiring of the present disclosure. The current setting information is an example of the current setting information of the present disclosure. In the process of S502, the CPU 11 should only receive the information on the items included in the setting information 421*c* and does not have to receive data on all items set in the MFP 50. For example, when the setting information 421*c* only includes a color setting as the information on the item of the print setting, the CPU 11 does not receive information on the items in the print setting other than the color setting from the MFP 50.

In S503 the CPU 11 determines whether the setting information specified by the setting information 421*c* acquired in S501 matches the setting information on the MFP 50 received in S502. The process of S503 is an example of the (f) determining of the present disclosure. The CPU 11 determines whether the setting information on the items received from the MFP 50 indicates the same setting as that specified by the setting information 421*c*.

If the two sets of information do not match (S503: NO), in S504 the CPU 11 controls the network IF 17 to transmit the setting information 421*c*, i.e., data stored under the item "SETTING INFORMATION" 421*c* in the schedule information DB 421 to the MFP 50. The process of S504 is an example of the (d) transmitting of the present disclosure.

The setting information 421*c* may include information on firmware. If the setting information 421*c* includes information on firmware, in the process of S502, the CPU 11 receives the version information of the firmware of the MFP 50. In the process of S503, the CPU 11 then determines whether the version specified by the setting information 421*c* matches the version of the firmware of the MFP 50. If the versions do not match, the CPU 11 transmits the firmware whose version is specified by the setting information 421*c*. In such a case, the CPU 11 also transmits an instruction for restarting the MFP 50.

After data is transmitted in S504 or after a predetermined time required for restarting the MFP 50 has passed, in S505 the CPU 11 re-accesses the MFP 50 and receives from the MFP 50 again the current setting information corresponding to the setting items included in the setting information 421*c*. The process of S505 is an example of the (k) acquiring of the present disclosure. Step S505 is the same process as step S502.

In S506 the CPU 11 determines whether the setting information specified by the setting information 421*c* acquired in S501 matches the setting information on the MFP 50 re-received in S505. The process of S506 is an example of the (1) determining of the present disclosure. Step S506 is the same process as step S503.

If the setting information 421*c* acquired in step S501 does not match the setting information on the MFP re-received in step S505 (S506: NO), in S507 the CPU 11 stores in the non-volatile memory 14 error information as the status information on the MFP 50. The process of S507 is an example of the (m) storing of the present disclosure. The error information on such erroneous setting information should include, for example, information on the relevant MFP 50, the information on the setting information 421*c* not matching the setting information currently set in the relevant MFP 50, and the date and time of the occurrence of the error. The CPU 11 may attempt a retry before storing the error information.

Subsequent to the process of S507 or if the setting information 421*c* acquired in S501 matches the setting information on the MFP 50 received in S502 or S505 (S503: YES or S506: YES), in S508 the CPU 11 updates the status information stored in the non-volatile memory 14. If status information of the MFP 50 is not stored in the non-volatile memory 14, the CPU 11 stores the status information of the MFP 50 in the non-volatile memory 14. Subsequent to the process of S508, the CPU 11 ends the management execution process and returns to performing the management process.

Figure 10:
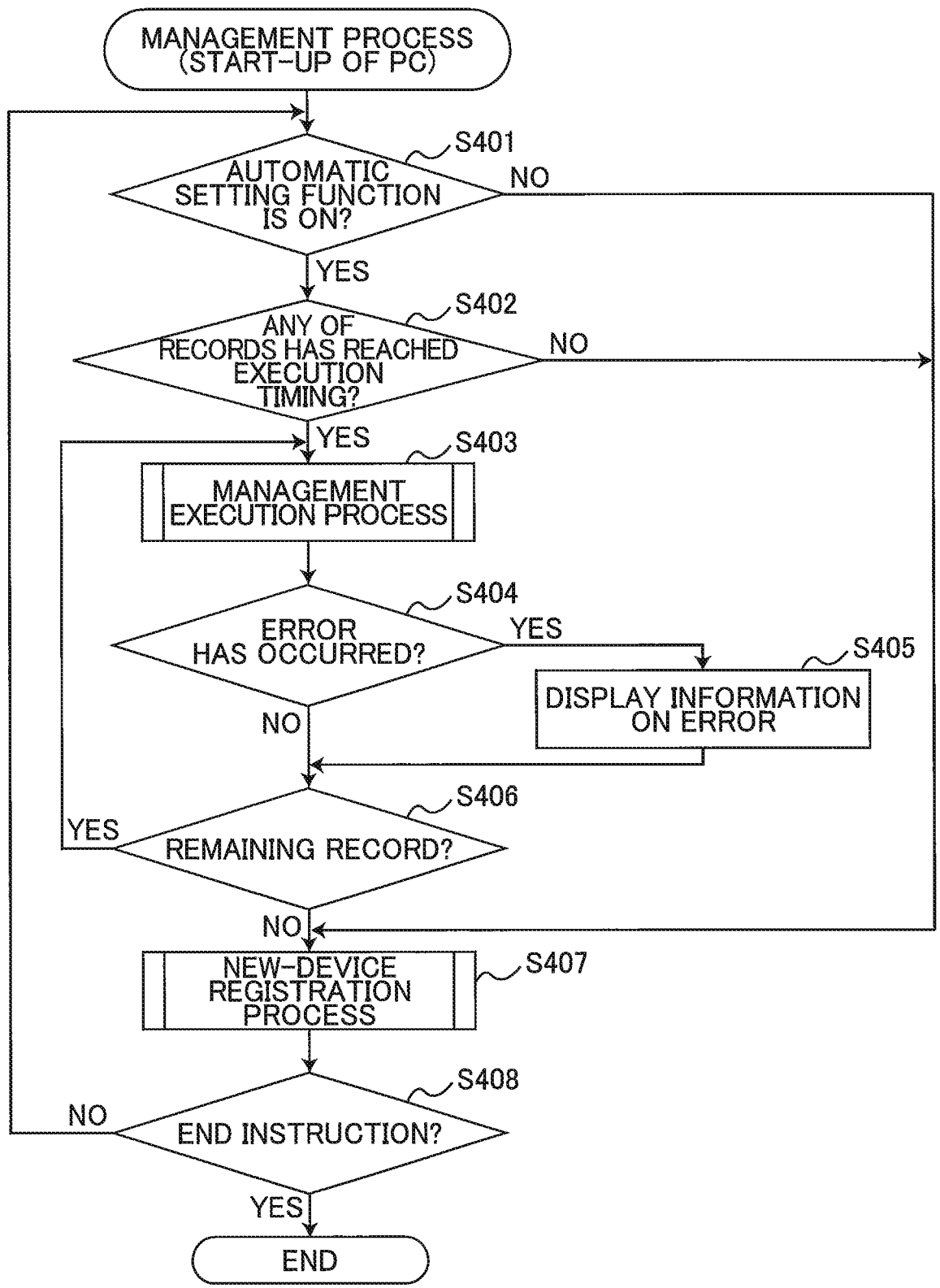
FIG. 10 is a flowchart illustrating steps in a management process executed by the CPU of the PC, and the management process is performed upon start-up of the PC.

Continuing with the description of the management process illustrated in FIG. 10, in S404 the CPU 11 determines whether a new error has occurred in the management execution process after the process of S403 in the management execution process. If a new error has occurred (S404: YES), in S405 the CPU 11 notifies the schedule setting program 411 to display an error as the status information. The process of S405 is an example of the (n) displaying of the present disclosure. For example, if the schedule setting program 411 is being executed and the status screen 62 illustrated in FIG. 6 is displayed, the CPU 11 updates the content of the status screen 62 to display information on the error. If the schedule setting program 411 is not being executed, the CPU 11 may start the schedule setting program 411 and display the information on the error. Alternatively, the CPU 11 may control the display 16 to display the information on the error, instead of notifying the schedule setting program 411 in S405. The status screen 62 displaying the information on the error is an example of the error notification screen of the present disclosure.

Subsequent to the process of S405 or if no new error has occurred (S404: NO), in S406 the CPU 11 determines whether a record that has reached the execution timing (S402: YES) remains. If such a record remains (S406: YES), the CPU 11 returns to performing the management execution process for the remaining record of S403.

If no record remains (S406: NO), if the automatic setting function is turned OFF (S401: NO), or if no record has reached the execution timing specified by the execution timing 421*d* (S402: NO), in S407 the CPU 11 performs the new-device registration process illustrated in FIG. 9. The CPU 11 may set a search timing, and may store the information specifying the search timing in the schedule information DB 421 besides the execution timing 421*d*. The CPU 11 may then determine whether the search timing has arrived and may perform the new-device registration process at the search timing besides the execution timing. In other words, the CPU 11 may periodically perform the new-device registration process.

Subsequent to the process of S407, in S408 the CPU 11 determines whether an end instruction is received. If an end instruction has not been received (S408: NO), the CPU 11 returns to performing the process of S401 and continues to perform the management process. If an end instruction is received (S408: YES), the CPU 11 ends the management process.

As described above, according to the network system 100 of the present embodiment and the set of program instructions employed on the network system 100 of the present embodiment, the PC 1 accesses an MFP 50 each time the execution timing comes, under the control of the set of program instructions according to the present embodiment. The MFP 50 to be accessed corresponds to the identifier 421*a* included in one record in the schedule information DB 421, and this record correlates the identifier 421*a* specifying the MFP 50 with the execution timing 421*d* specifying the execution timing described above. The PC 1 then receives, from the MFP 50, setting information corresponding to the setting information 421*c* correlated with the identifier 421*a* and the execution timing 421*d* by the record. If the setting information from the MFP 50 does not indicate that the setting information 421*c* correlated by the record has already been set in the MFP 50, the PC 1 transmits, to the MFP 50, the setting information specified by the setting information 421*c* correlated by the record. This automatically sets the setting information specified by the setting information 421*c* in the MFP 50. Thus, the various settings of the MFP 50 and the setting information specified by the setting information 421*c* stored in the PC 1 can be synchronized to automatically restore the settings of the MFP 40 even if the settings are accidentally modified. As a result, the maintenance worker does not need to perform a maintenance operation on each MFP 50, thereby reducing the workload of the maintenance worker.

In the present embodiment, a record including an identifier 421*a* specifying a plurality of devices can be stored in the schedule information DB 421. This allows the plurality of devices to be configured collectively using the shared setting information which is specified by the setting information 421*c* and the shared executing timing which is specified by the execution timing 421*d*. Thus, a record does not have to be generated for every device. As a result, the workload of generating and editing records is reduced. In addition, since the same setting in the plurality of devices can be synchronized, the workload of the maintenance worker can be further reduced.

In the present embodiment, a group name can be specified by the information on the identifier 421*a* of the schedule information DB 421. Thus, the devices can be readily managed in groups. For example, when a device is repositioned, the only modification needed may be reconfiguration of the groups in the group information DB 422. This reduces the workload of the administrator. Since a plurality of groups can be specified, devices can be readily exchanged between groups.

In the present embodiment, the schedule setting program 411 instructs the CPU 11 to perform the display process, and the schedule executing program 412 instructs the CPU 11 to perform the management process. After the schedule information DB 421 is configured by performing the display process, the MFPs 50 can be synchronized under the control of the schedule executing program 412, without executing the schedule setting program 411. Thus, the network system 100 can be operated in an environment in which only the administrator can activate the schedule setting program 411 or an environment in which the PC 1 stores the schedule information DB 421 but not the schedule setting program 411. In this way, an environment can be established in which no one other than the administrator can modify the schedule information DB 421. In other words, a highly safe environment can be established. In addition, since the schedule setting program 411 and the schedule executing program 412 are provided as separate programs, the programs can be readily modified.

In the present embodiment, the automatic setting function can be turned ON/OFF. Thus, the automatic setting function can be temporarily turned OFF, for example, when an excessive load is applied to the CPU 11 due to other processes, to reduce the load. In other words, the automatic transmission function can be activated or inactivated. This enhances usability.

In the present embodiment, the setting information 421c can include information on firmware. Thus, the firmware can be automatically updated. This can further reduce the workload of the maintenance worker. Since the only information on the firmware that should be provided in the setting information 421c is version information, the data size of the setting information 421c can be suppressed from becoming excessively large.

In the present embodiment, error information is stored in the case of incorrect settings after transmission of the setting information 421c. Thus, the MFP 50 that requires maintenance can be specified. This enhances the work efficiency. In addition, since the error information is displayed, the maintenance worker can readily identify the MFP 50 that requires maintenance. The content of the error information to be displayed may be selectable, as required. For example, the display may include only the number of devices having an error or information specifying a particular device.

In the present embodiment, when a new device is found in a search, a record on the new device is automatically added to the schedule information DB 421. Thus, the workload of the maintenance worker can be reduced. By configuring the rule information DB 423, schedule information in accordance with the model is automatically added to the schedule information DB 421. For example, when a plurality of MFPs 50 of the same model are introduced to the network system 100, the same setting information 421c is automatically applied to all of these MFPs 50. Thus, advanced setup operations are not required during introduction of the MFPs 50. This reduces the workload of the maintenance worker.

In the present embodiment, the received current setting information of the devices is compared with the setting information 421c in the schedule information DB 421. Thus, whether the setting information 421c has already been set in the devices can be readily determined. By receiving only the setting information of the items included in the setting information 421c as the current setting information of the devices, the communication load can be reduced.

In the present embodiment, a plurality of records can be stored in the schedule information DB 421. Thus, various settings of a plurality of devices can be comprehensively managed. For example, different settings can be established in the same device at different timings.

Figure 11:
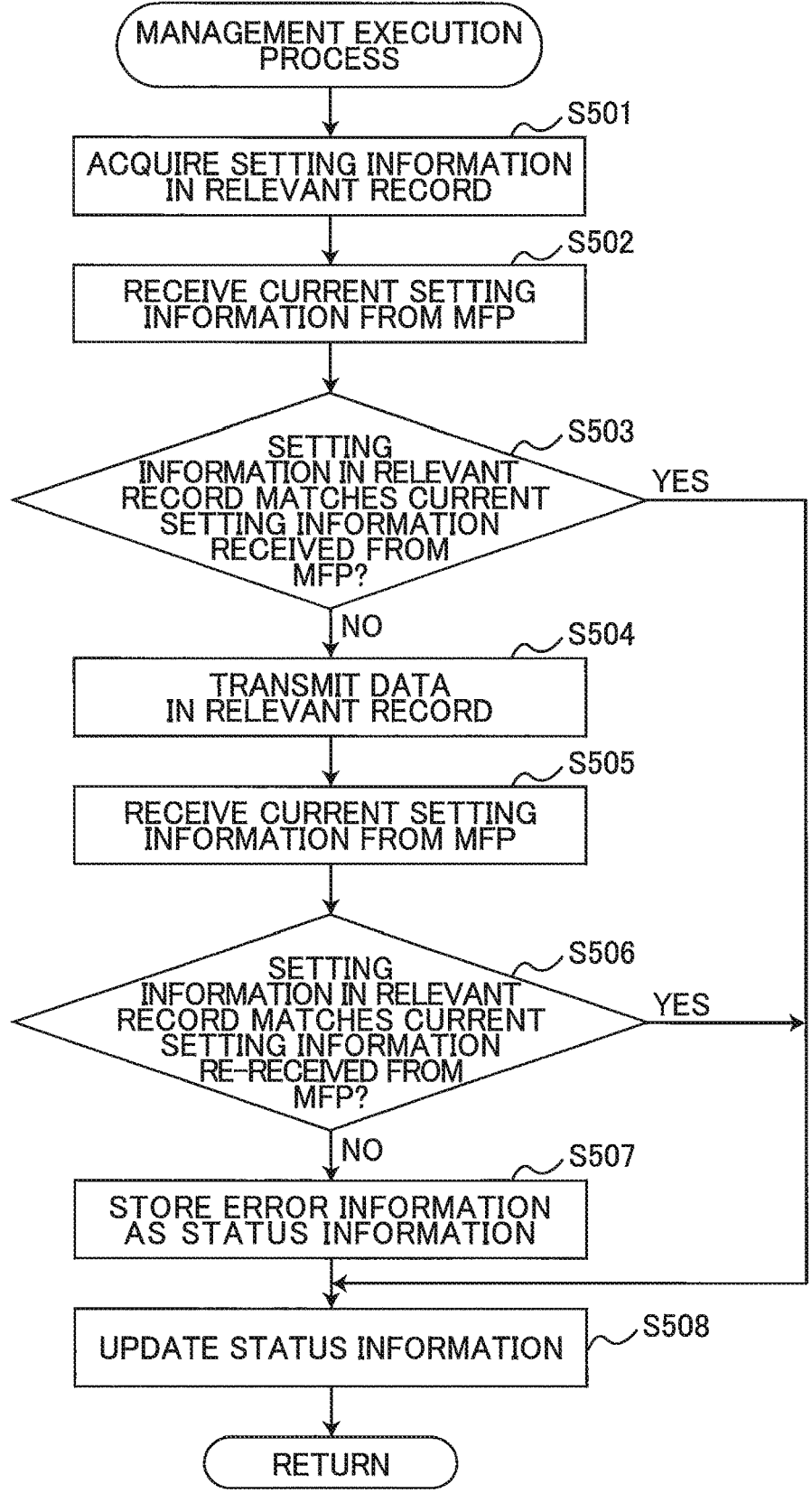
FIG. 11 is a flowchart illustrating steps in a management execution process executed by the CPU of the PC.

In the present embodiment, the current setting information is received from an MFP 50 during the management execution process illustrated in FIG. 11 and compared with the setting information 421c in the schedule information DB 421. When two sets of information differ, the setting information 421c is transmitted. Alternatively, the information may be transmitted without comparison. In specific, the setting information 421c may always be overwritten. For example, steps S502 and S503 in the management execution process illustrated in FIG. 11 may be omitted, and step S504 may be performed subsequent to step S501.

Transmission of the setting without comparison is a simpler process than transmission of the settings determined to be different through comparison as in the above-described embodiment. Thus, performing maintenance without comparison may require less time. However, transmission without comparison may cause an increase in communication load depending on the size of the setting information 421c because the setting information 421c is transmitted at every execution timing. When information on firmware is included in the setting information 421c, the MFP 50 is restarted at every execution timing. This may reduce the operability of the MFP 50 for the user.

While the description has been made in detail with reference to specific embodiment, it would be apparent to those skilled in the art that various changes and modifications may be made thereto. For example, the present disclosure can be applied to any device having an image forming function and a network communication function, such as printers, copying devices, and facsimiles, besides MFPs.

In the embodiment described above, the identifier 421a in the schedule information DB 421 can include information specifying a plurality of devices and groups. Alternatively, the identifier 421a may include information specifying either the plurality of devices or groups, or neither. In specific, the records in the schedule information DB 421 may each include information correlated to a single device.

For example, the group information DB 422 and the rule information DB 423 may be omitted. Alternatively, the setting file storing the setting information 421c may be omitted. Alternatively, the setting information 421c may not include information on firmware.

In the embodiment described above, the schedule setting program 411 and the schedule executing program 412 are provided. Alternatively, these programs may be provided as a single program. The schedule executing program 412 is a resident program of the PC 1. Alternatively, the schedule executing program 412 may not be a resident program. For example, the schedule executing program 412 may be launched or terminated in response to instructions from a user.

In the embodiment described above, the execution of the setting input process starts when the setting button 621 in the status screen 62 is operated. Alternatively, the setting input process may be executed in response to a direct start instruction. For example, the PC 1 may instruct the display 16 to display a list of records registered in the schedule information DB 421, a registration button, and an edit button. When one record is specified and the edit button is operated, the execution of the setting input process may start.

For example, the order of the determination steps S103, S105, S107, and S110 in the display process is not limited to that illustrated in FIG. 5. The order of the determination steps S202, S204, S207, and S209 in the setting input process is not limited to that illustrated in FIG. 7. Some of these steps may be omitted. For example, at least one of a setting input instruction, a search instruction, and an instruction for turning ON/OFF the automatic setting function (ON/OFF state switching instruction) may not be accepted. In specific, at least few of the steps S103 to S109 in the display process may be omitted. In such a case, the status screen 62 may not include at least one of the setting button 621, the search button 622, and the function ON/OFF button 623.

For example, the new-device registration process is performed in the management process. Alternatively, the new-device registration process may not be performed in the management process. Alternatively, the new-device registration process may be performed when the automatic setting function is turned ON (S401: YES) and may not be performed when the automatic setting function is turned OFF (S401: NO). When the management process starts, the status screen 62 may be displayed. When the status screen 62 receives an instruction not to display the status, the display of the status screen 62 may be terminated.

For example, the management execution process determines whether the setting information from the MFP 50 matches the setting information 421c. However, the management execution process should only determine whether the settings of the MFP 50 is in accordance with information on the setting information 421c. Thus, the parameters of the items do not need to be received. For example, after data is transmitted in S504 of the management execution process, a step of receiving information indicating whether setting was successful from the MFP 50 may be performed in place of S505, and a step of determining whether the setting was successful on the basis of the received information may be performed in place of S506. The information indicating whether the setting was successful may be, for example, a hash generated from the data to be transmitted to the MFP 50. The CPU 11, for example, stores a hash generated on the basis of the record to be transmitted and may perform S506 on the basis of whether this hash matches the returned hash. In specific, the CPU 11 should be able to determine whether the setting information 421c has already been set in the MFP 50.

For example, the steps of receiving and determining the setting information again may be omitted. In specific, the steps S505 to S507 in the management execution process may be omitted.

The processes according to the embodiment described above may be performed by any one of a single CPU, a plurality of CPUs, and hardware such as an application specific integrated circuit (abbreviated as "ASIC") or any combination of these. The processes according to the embodiment described above may be provided through various modes such as a non-transitory computer readable storage medium storing a set of program instructions for performing the processes or a method of performing the processes.

What is claimed is:

1. A maintenance system comprising an information processing device and an image forming device connectable with the information processing device via a network, the information processing device comprising:
    an input interface;
    a network interface;
    a memory; and
    a controller configured to perform:
       (a) receiving a set of input information via the input interface, the set of input information including device information, time information, and setting information, the device information specifying a target image forming device, the time information specifying access time to access the target image forming device, the setting information relating to control data to be set in the target image forming device;
       (b) storing first correlation information in the memory, the first correlation information correlating the device information with the time information and the setting information;
       (c) determining whether the access time specified by the time information has come, the time information being correlated by the first correlation information stored in the memory; and
       (d) transmitting, in response to determining that the access time has come, the control data to the target image forming device via the network interface, the target image forming device being specified by the device information correlated with the time information specifying the access time by the first correlation information;
       (e) acquiring, in response to determining that the access time has come in the (c) determining, current setting information from the target image forming device via the network interface, the target image forming device being specified by the device information correlated with the time information by the first correlation information, the current setting information relating to current control data corresponding to the control data and currently set in the target image forming device; and
       (f) determining whether the control data has already been set in the target image forming device on the basis of the current setting information,
    wherein the (d) transmitting is performed in response to determining that the control data has not yet been set in the target image forming device.

2. The maintenance system according to claim 1, wherein a plurality of image forming devices is connectable with the information processing device via the network,
    wherein the device information specifies a plurality of target image forming devices from among the plurality of image forming devices,
    wherein the (e) acquiring acquires a plurality of sets of current setting information from respective ones of the plurality of target image forming devices via the network interface, and
    wherein the (f) determining and the (d) transmitting are performed for each of the plurality of sets of current setting information.

3. The maintenance system according to claim 1, wherein the set of input information includes group information, the time information, and the setting information, the group information specifying a group including the plurality of target image forming devices, and
    wherein the first correlation information correlates the group information with the time information and the setting information.

4. The maintenance system according to claim 3, wherein the group information specifies a plurality of groups, each of the plurality of groups including the plurality of target image forming devices, and
    wherein the (b) storing stores a plurality of sets of first correlation information corresponding to respective ones of the plurality of groups.

5. The maintenance system according to claim 1, wherein the information processing device further comprises a display,
    wherein the controller is configured to further perform:
       (g) displaying on the display an input screen for receiving the set of input information via the input interface, the input screen displaying the set of input information; and
       (h) updating the input screen,
    wherein the (a) receiving receives the set of input information while the (g) displaying is performed,
    wherein the (b) storing stores in the memory the set of input information received via the input screen as the first correlation information, and
    wherein the (h) updating updates the input screen in accordance with the first correlation information stored in the memory.

6. The maintenance system according to claim 5, wherein the controller is configured to further perform:

(i) receiving automatic transmission information specifying an automatic transmission function; and
(j) determining whether the automatic transmission function is available from the automatic transmission information, and
wherein the (c) determining is performed in response to determining that the automatic transmission function is available.

7. The maintenance system according to claim 1, wherein the setting information includes firmware information specifying a version of firmware,
wherein the current setting information includes current firmware information specifying a current version of firmware of the target image forming device, and
wherein the (f) determining determines that the control data has already been set in the target image forming device when the current version of the firmware specified by the current firmware information matches the version of the firmware specified by the firmware information included in the setting information.

8. The maintenance system according to claim 1, wherein the controller is configured to further perform:
(k) acquiring, after the (d) transmitting is performed, new setting information from the target image forming device via the network interface, the new setting information relating to new control data newly set in the target image forming device after the (d) transmitting is performed;
(l) determining whether the control data has already been set in the target image forming device on the basis of the new setting information; and
(m) storing, in response to determining that the control data has not yet been set in the target image forming device, error information indicating that the control data has not yet been set in the target image forming device.

9. The maintenance system according to claim 8, wherein the information processing device further comprises a display, and
wherein the controller is configured to further perform (n) displaying on the display an error notification screen based on the error information stored in the memory, the error notification screen notifying that the control data has not yet been set in the target image forming device.

10. The maintenance system according to claim 1, wherein the controller is configured to further perform:
(o) storing second correlation information in the memory, the second correlation information correlating a type information with the time information and the setting information, the type information specifying a type of the target image forming device;
(p) searching for a newly-connected image forming device via the network interface, the newly-connected image forming device being newly-connected with the information processing device via the network, first correlation information including device information specifying the newly-connected image forming device having not been stored in the memory;
(q) determining whether a type of the newly-connected image forming device corresponds to the type information included in the second correlation information stored in the memory; and
(r) storing, in response to determining that the type of the newly-connected image forming device corresponds to the type information, additional first correlation information in the memory, the additional first correlation information correlating the device information specifying the newly-connected image forming device with the time information and the setting information included in the second correlation information.

11. The maintenance system according to claim 1, wherein the (e) acquiring acquires the current control data as the current setting information, and
wherein the (f) determining determines that the control data has already been set in the target image forming device in a case where the current control data matches the control data whereas the (f) determining determines that the control data has not yet been set in the target image forming device in a case where the current control data does not match the control data.

12. The maintenance system according to claim 1, wherein the control data includes a plurality of sets of setting data classified into respective ones of a plurality of types,
wherein the set of input information including type information specifying a type of a specific set of setting data,
wherein the first correlation information correlates the device information with the time information and the type information,
wherein the (e) acquiring acquires the current setting information relating to the current control data corresponding to the specific set of setting data specified by the type information, and
wherein the (f) determining determines that the control data has already been set in the target image forming device in a case where the current control data matches the specific set of setting data whereas the (f) determining determines that the control data has not yet been set in the target image forming device in a case where the current control data does not match the specific set of setting data.

13. The maintenance system according to claim 1, wherein the memory is configured to store a plurality of sets of first correlation information, and
wherein the (c) determining is performed for each of the plurality of sets of first correlation information.

14. A non-transitory computer readable storage medium storing a set of program instructions for an information processing device with which an image forming device is connectable via a network, the information processing device including: an input interface; a network interface; a memory; and a controller, the set of program instructions, when installed on and executed by the controller, causing the information processing device to perform:
receiving a set of input information via the input interface, the set of input information including device information, time information, and setting information, the device information specifying a target image forming device, the time information specifying access time to access the target image forming device, the setting information relating to control data to be set in the target image forming device;
storing correlation information in the memory, the correlation information correlating the device information with the time information and the setting information;
determining whether the access time specified by the time information has come, the time information being correlated by the correlation information stored in the memory; and
transmitting, in response to determining that the access time has come, the control data to the target image forming device via the network interface, the target image forming device being specified by the device information correlated with the time information specifying the access time by the correlation information;

acquiring, in response to determining that the access time has come in the (c) determining, current setting information from the target image forming device via the network interface, the target image forming device being specified by the device information correlated with the time information by the first correlation information, the current setting information relating to current control data corresponding to the control data and currently set in the target image forming device; and determining whether the control data has already been set in the target image forming device on the basis of the current setting information, wherein the transmitting the control data is performed in response to determining that the control data has not yet been set in the target image forming device.

15. An information processing device comprising:
an input interface;
a network interface;
a memory; and
a controller configured to perform:
  receiving a set of input information via the input interface, the set of input information including device information, time information, and setting information, the device information specifying a target image forming device, the time information specifying access time to access the target image forming device, the setting information relating to control data to be set in the target image forming device;

storing correlation information in the memory, the correlation information correlating the device information with the time information and the setting information;

determining whether the access time specified by the time information has come, the time information being correlated by the correlation information stored in the memory; and transmitting, in response to determining that the access time has come, the control data to the target image forming device via the network interface, the target image forming device being specified by the device information correlated with the time information specifying the access time by the correlation information;

acquiring, in response to determining that the access time has come in the (c) determining, current setting information from the target image forming device via the network interface, the target image forming device being specified by the device information correlated with the time information by the first correlation information, the current setting information relating to current control data corresponding to the control data and currently set in the target image forming device; and determining whether the control data has already been set in the target image forming device on the basis of the current setting information, wherein the transmitting the control data is performed in response to determining that the control data has not yet been set in the target image forming device.

* * * * *